(12) United States Patent
Whatmough et al.

(10) Patent No.: US 11,501,151 B2
(45) Date of Patent: Nov. 15, 2022

(54) PIPELINED ACCUMULATOR

(71) Applicant: Arm Limited, Cambridge (GB)

(72) Inventors: Paul Nicholas Whatmough, Cambridge, MA (US); Zhi-Gang Liu, Westford, MA (US); Matthew Mattina, Boylston, MA (US)

(73) Assignee: Arm Limited, Cambridge (GB)

( * ) Notice: Subject to any disclaimer, the term of this patent is extended or adjusted under 35 U.S.C. 154(b) by 358 days.

(21) Appl. No.: 16/885,704

(22) Filed: May 28, 2020

(65) Prior Publication Data

US 2021/0374508 A1    Dec. 2, 2021

(51) Int. Cl.
*G06N 7/00* (2006.01)
*G06N 3/063* (2006.01)

(52) U.S. Cl.
CPC .............. *G06N 3/063* (2013.01); *G06N 7/00* (2013.01)

(58) Field of Classification Search
CPC ........ G06N 3/063; G06N 7/00; G06N 3/0445; G06N 3/0481; G06N 3/0454; G06N 3/084
See application file for complete search history.

(56) References Cited

U.S. PATENT DOCUMENTS

| 9,575,725 | B1* | 2/2017 | Langhammer | G06F 7/485 |
| 10,572,225 | B1* | 2/2020 | Ghasemi | G06N 3/08 |
| 10,649,736 | B2* | 5/2020 | Olsen | G06F 17/16 |
| 2005/0240646 | A1* | 10/2005 | Lin | G06F 17/16 |
| | | | | 708/607 |
| 2005/0267926 | A1* | 12/2005 | Al-Khoraidly | G06F 7/724 |
| | | | | 708/492 |
| 2009/0248779 | A1* | 10/2009 | Brooks | G06F 7/483 |
| | | | | 708/523 |
| 2012/0233234 | A1* | 9/2012 | Brooks | G06F 7/5338 |
| | | | | 708/521 |
| 2018/0189638 | A1* | 7/2018 | Nurvitadhi | G06N 3/063 |
| 2018/0246855 | A1* | 8/2018 | Redfern | G06F 3/0613 |
| 2019/0050717 | A1* | 2/2019 | Temam | G06N 3/063 |
| 2019/0138567 | A1* | 5/2019 | Martin | G06F 7/5443 |
| 2019/0220734 | A1* | 7/2019 | Ferdman | G06N 3/0454 |
| 2019/0220742 | A1* | 7/2019 | Kuo | G06N 3/063 |
| 2020/0272417 | A1* | 8/2020 | Feng | G06N 3/063 |
| 2021/0049463 | A1* | 2/2021 | Ruff | G06N 3/04 |
| 2021/0142155 | A1* | 5/2021 | James | G06N 3/063 |
| 2021/0157549 | A1* | 5/2021 | Elmer | G06N 3/0454 |

(Continued)

OTHER PUBLICATIONS

Weber et al. "BrainSlug: Transparent Acceleration of Deep Learning Through Depth-First Parallelism" (Year: 2020).*

(Continued)

*Primary Examiner* — Fernando Alcon
(74) *Attorney, Agent, or Firm* — Leveque Intellectual Property Law, P.C.

(57) ABSTRACT

The present disclosure advantageously provides a pipelined accumulator that includes a data selector configured to receive a sequence of operands to be summed, an input register coupled to the data selector, an output register, coupled to the data selector, configured to store a sequence of partial sums and output a final sum, and a multi-stage add module coupled to the input register and the output register. The multi-stage add module is configured to store a sequence of partial sums and a final sum in a redundant format, and perform back-to-back accumulation into the output register.

20 Claims, 10 Drawing Sheets

(56) References Cited

U.S. PATENT DOCUMENTS

2021/0174180 A1\* 6/2021 Huang .................... G11C 11/54
2021/0182465 A1\* 6/2021 Langhammer ......... G06N 20/00
2021/0241071 A1\* 8/2021 Lorrain ................ G06F 17/153

OTHER PUBLICATIONS

Stoutchinin et al. "Optimally Scheduling CNN Convolutions for Efficient Memory Access" (Year: 2019).\*
Azizimazreah et al. "Shortcut Minin: Exploiting Cross-layer Shortcut Reuse in DCNN Accelerators", 2019 IEEE International Symposium on High Performance Computer Architecture (Year: 2019).\*
Alwani et al., "Fused-Layer CNN Accelerators" (Year: 2016).\*

\* cited by examiner

1st Cycle (Reset)

2nd Cycle (1st Operand Input)

3rd Cycle (2nd Operand Input)

4th Cycle (3rd Operand Input)

5th Cycle (4th Operand Input)

6th Cycle (5th Operand Input)

7th Cycle (Bubble)

8th Cycle (Alignment)

9th Cycle (Final Sum)

PIPELINED ACCUMULATOR

BACKGROUND

The present disclosure relates to computer systems. More particularly, the present disclosure relates to computer systems that include neural networks.

Artificial neural networks (ANNs), such as deep neural networks (DNNs), convolutional neural networks (CNNs), etc., are a popular solution to a wide array of challenging classification, recognition and regression problems. However, many ANN models require a large number of calculations involving a large number of weights and activations, which presents a significant challenge with respect to access, storage and performance, particularly for mobile and other power or storage-constrained devices. An ANN hardware accelerator accelerates these calculations, such as, for example, the multiply-and-accumulate (e.g., dot product) operations performed by CNNs.

CNN kernels calculate large dot-products, which involve repeated multiply operations that are added into an accumulator register. If the add datapath is pipelined, as is typically the case for floating-point data, then there is a dependency on reading the accumulator register from the previous cycle. This is simply due to the fact that the result from the preceding instruction must complete to be used as an input operand for the following instruction.

DETAILED DESCRIPTION

Figure 1:
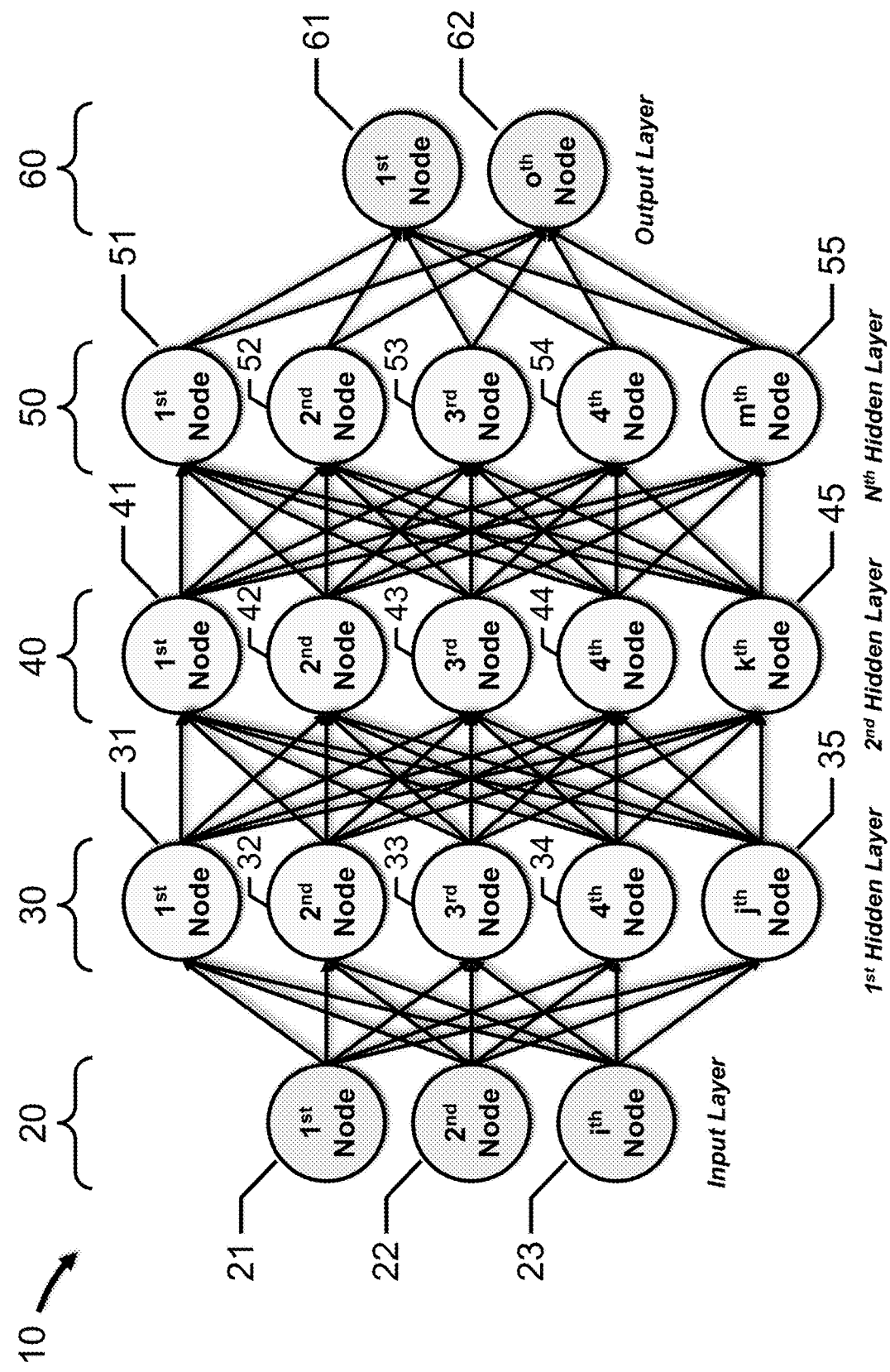
FIG. 1 depicts an ANN, in accordance with an embodiment of the present disclosure.

Embodiments of the present disclosure will now be described with reference to the drawing figures, in which like reference numerals refer to like parts throughout.

Embodiments of the present disclosure advantageously provide a pipelined accumulator without stalls for register dependency. When accumulating a large number of operands, which is common for large dot-products, the instantaneous value of the accumulator is only required at the end of the final dot product calculation. In other words, the true correct value is only required at the end of the sequence when the accumulator register is read out. Accordingly, embodiments of the present disclosure advantageously relax the register dependency and allow back-to-back accumulation into the same register.

In one embodiment, a pipelined accumulator includes a data selector configured to receive a sequence of operands to be summed, an input register coupled to the data selector, an output register, coupled to the data selector, configured to store a sequence of partial sums and output a final sum, and a multi-stage add module coupled to the input register and the output register. The multi-stage add module is configured to store a sequence of partial sums and a final sum in a redundant format, and perform back-to-back accumulation into the output register.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tanh function, a rectified linear unit (ReLU) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation value that is provided to the activation function for that node. The output of the activation function is then provided as an input data value to each output layer node. At each output layer node, the output data value received from each hidden layer node is multiplied by a respective connection weight, and the resulting products are summed or accumulated into an activation value that is provided to the activation function for that node. The output of the activation function is then provided as output data. Additional hidden layers may be similarly configured to process data.

FIG. 1 depicts ANN 10, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes.

In one embodiment, N equals 3, i equals 3, j, k and m equal 5 and o equals 2 (depicted in FIG. 1). Input node 21 is coupled to hidden nodes 31 to 35, input node 22 is coupled to hidden nodes 31 to 35, and input node 23 is coupled to hidden nodes 31 to 35. Hidden node 31 is coupled to hidden nodes 41 to 45, hidden node 32 is coupled to hidden nodes 41 to 45, hidden node 33 is coupled to hidden nodes 41 to 45, hidden node 34 is coupled to hidden nodes 41 to 45, and hidden node 35 is coupled to hidden nodes 41 to 45. Hidden node 41 is coupled to hidden nodes 51 to 55, hidden node 42 is coupled to hidden nodes 51 to 55, hidden node 43 is coupled to hidden nodes 51 to 55, hidden node 44 is coupled to hidden nodes 51 to 55, and hidden node 45 is coupled to hidden nodes 51 to 55. Hidden node 51 is coupled to output nodes 61 and 62, hidden node 52 is coupled to output nodes 61 and 62, hidden node 53 is coupled to output nodes 61 and 62, hidden node 54 is coupled to output nodes 61 and 62, and hidden node 55 is coupled to output nodes 61 and 62.

Many other variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

A multi-layer perceptron (MLP) is a fully-connected ANN that has an input layer, an output layer and one or more hidden layers. MLPs may be used for natural language processing applications, such as machine translation, speech recognition, etc. Other ANNs include recurrent neural networks (RNNs), long short-term memories (LSTMs), sequence-to-sequence models that include an encoder RNN and a decoder RNN, shallow neural networks, etc.

A CNN is a variation of an MLP that may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLU function as the activation function. In certain embodiments, the activation function is provided in a separate activation layer, such as, for example, a ReLU layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

Figure 2:
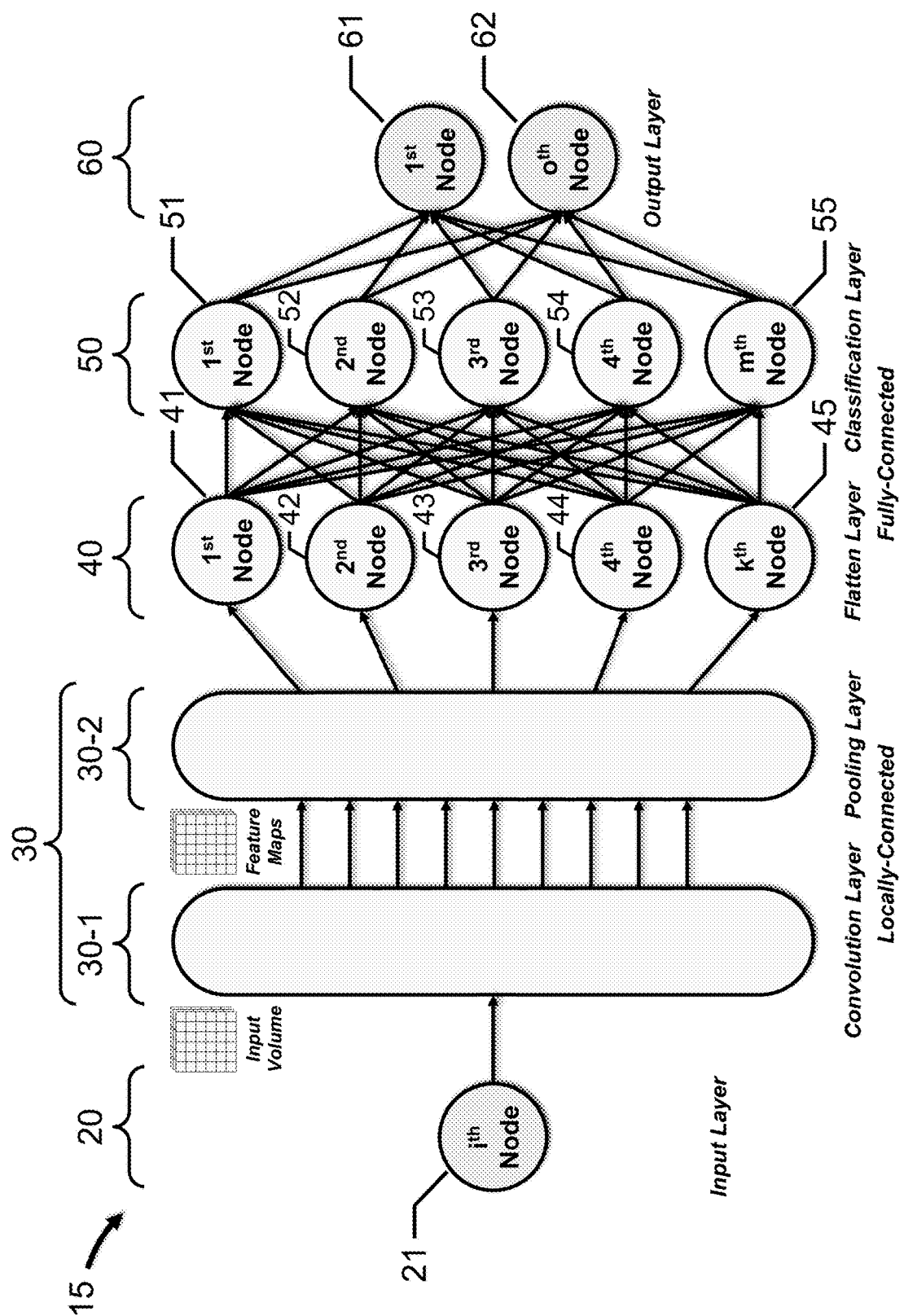
FIG. 2 depicts a convolutional neural network (CNN), in accordance with an embodiment of the present disclosure.

FIG. 2 depicts CNN 15, in accordance with an embodiment of the present disclosure. CNN 15 includes input layer 20, one or more hidden layers, such as convolutional layer 30-1, pooling layer 30-2, hidden (flatten) layer 40, hidden (classification) layer 50, etc., and output layer 60. Many other variations of input, hidden and output layers are contemplated.

Input layer 20 includes one or more input nodes 21, etc., that present the input data, such as a color image, as an input volume to the first convolutional layer, e.g., convolutional layer 30-1. The input volume is a three-dimensional matrix that has a width, a height and a depth. For example, input data that represent a color image are presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer 30-1 is locally-connected to input layer 20, and includes a plurality of nodes that are connected to local regions in the input volume (not depicted for clarity). For a CNN that uses a standard convolution, each node computes a dot product between the node's weights and the respective local region of the input volume. An activation function is then applied to the results of each convolution calculation to produce an output volume that is provided as an input volume to the subsequent layer. The activation function may be applied by each convolutional layer node or by the nodes of a subsequent locally-connected ReLU layer.

Pooling layer 30-2 is locally-connected to convolutional layer 30-1, and includes a plurality of nodes that are connected to local regions in the input volume (not depicted for clarity). Pooling layer 30-2 also produces an output volume that is provided as the input volume to the subsequent layer, such as, for example, another convolutional layer 30-1, a flatten layer 40, etc. In certain embodiments, convolutional layer 30-1 and pooling layer 30-2 form a single hidden layer 30. Similarly, in certain embodiments, convolutional layer 30-1, a ReLU layer and pooling layer 30-2 form a single hidden layer 30. Generally, the output volumes of the convolutional and pooling layers may be described as feature maps, and one or more single hidden layers 30 form a feature learning portion of CNN 15.

Hidden layer 40 is a "flatten" layer that is locally-connected to pooling layer 30-2, and includes one or more hidden (flatten) nodes 41, 42, 43, 44, 45, etc. Hidden (flatten) layer 40 "flattens" the output volume produced by the preceding pooling layer 30-2 into a column vector, which is provided to the subsequent, fully-connected hidden layer 50.

Hidden layer 50 is a classification layer that is fully-connected to hidden (flatten) layer 40, and includes one or more hidden (classification) nodes 51, 52, 53, 54, 55, etc.

Output layer 60 includes one or more output nodes 61, 62, etc., and is fully-connected to hidden (classification) layer 50. Fully-connected output layer 60 receives the classification results output by hidden (classification) layer 50, and each node outputs a predicted class score. A normalization function, such as a Softmax function, may be applied to the predicted class scores by output layer 60, or, alternatively, by an additional layer interposed between hidden (classification) layer 50 and output layer 60.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network. Matrix multiplication operations, and, more particularly, multiply-and-accumulate (MAC) operations, are used extensively by CNNs, as well as other ANNs.

Figure 3:
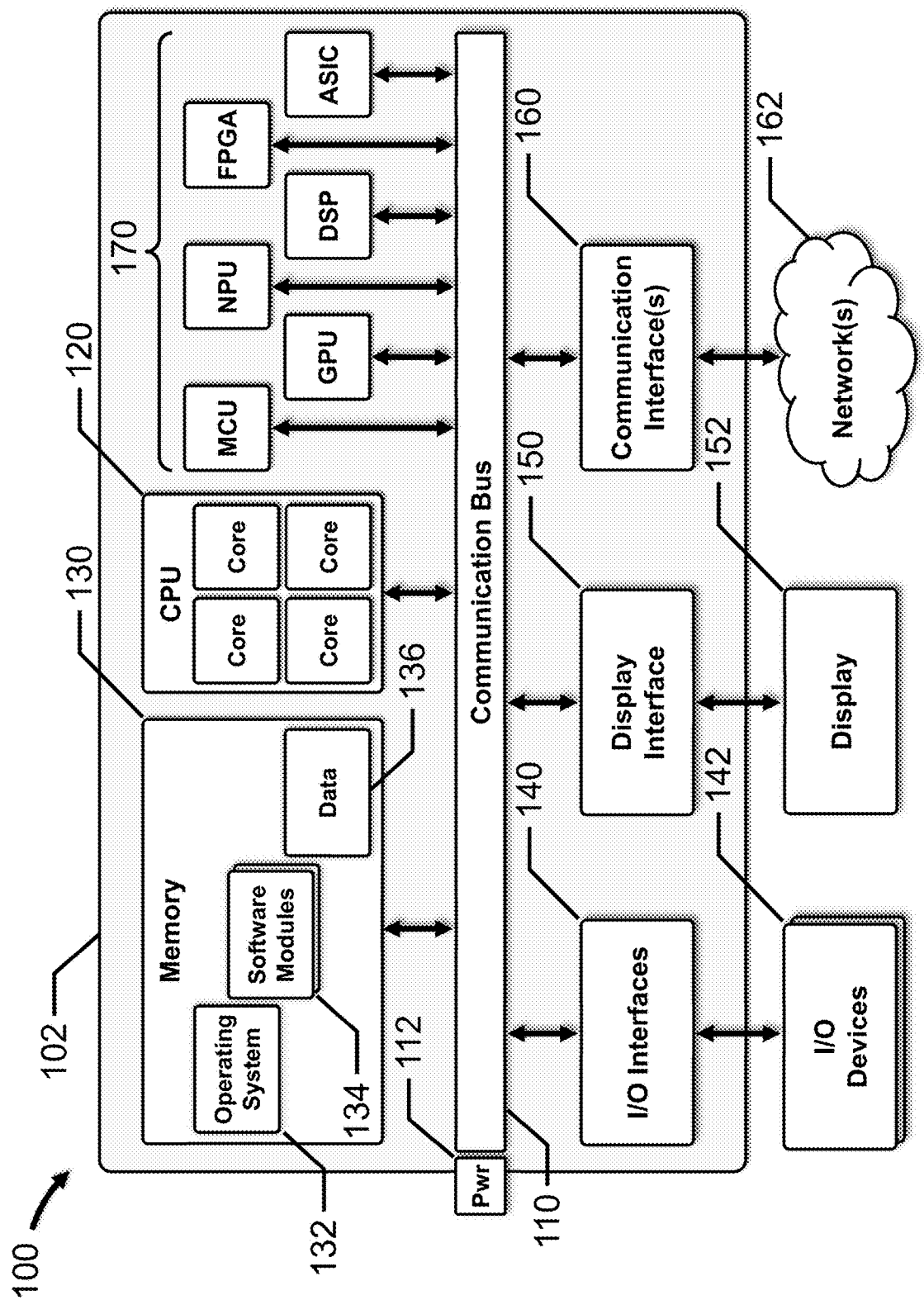
FIG. 3 depicts a block diagram of a system, in accordance with embodiments of the present disclosure.

FIG. 3 depicts a block diagram of system 100, in accordance with embodiments of the present disclosure.

System 100 includes communication bus 110 coupled to one or more processors 120, memory 130, I/O interfaces 140, display interface 150, one or more communication interfaces 160, and one or more HAs 170. Generally, I/O interfaces 140 are coupled to I/O devices 142 using a wired or wireless connection, display interface 150 is coupled to display 152, and communication interface 160 is connected to network 162 using a wired or wireless connection. In some embodiments, certain components of system 100 are implemented as a system-on-chip (SoC) 102; in other embodiments, system 100 may be hosted on a traditional printed circuit board, motherboard, etc.

In certain embodiments, system 100 is an embedded system in which one or more of the components depicted in FIG. 3 are not present, such as, for example, I/O interfaces 140, I/O devices 142, display interface 150, display 152, etc. Additionally, certain components, when present, may be optimized based on various design constraints, such as, for example, power, area, etc., such as, for example, HA 170.

Communication bus 110 is a communication system that transfers data between processor 120, memory 130, I/O interfaces 140, display interface 150, communication interface 160, HAs 170, as well as other components not depicted in FIG. 3. Power connector 112 is coupled to communication bus 110 and a power supply (not shown). In certain embodiments, communication bus 110 is a network-on-chip (NoC).

Processor 120 includes one or more general-purpose or application-specific microprocessors that executes instructions to perform control, computation, input/output, etc. functions for system 100. Processor 120 may include a single integrated circuit, such as a micro-processing device, or multiple integrated circuit devices and/or circuit boards working in cooperation to accomplish the functions of processor 120. Additionally, processor 120 may include multiple processing cores, as depicted in FIG. 3. Generally, system 100 may include one or more processors 120, each containing one or more processing cores as well as various other modules.

In some embodiments, system 100 may include 2 processors 120, each containing multiple processing cores. For example, one processor 120 may be a high performance processor containing 4 "big" processing cores, e.g., Arm Cortex-A73, Cortex-A75, Cortex-A76, etc., while the other processor 120 may be a high efficiency processor containing 4 "little" processing cores, e.g., Arm Cortex-53, Arm Cortex-55, etc. In this example, the "big" processing cores include a memory management unit (MMU). In other embodiments, system 100 may be an embedded system that includes a single processor 120 with one or more processing cores, such as, for example, an Arm Cortex-M core. In these embodiments, processor 120 typically includes a memory protection unit (MPU).

In many embodiments, processor 120 may also be configured to execute classification-based machine learning (ML) models, such as, for example, ANNs, DNNs, CNNs, RNNs, SVM, Naïve Bayes etc. In these embodiments, processor 120 may provide the same functionality as a hardware accelerator, such as HA 170. For example, system 100 may be an embedded system that does not include HA 170.

In addition, processor 120 may execute computer programs or modules, such as operating system 132, software modules 134, etc., stored within memory 130. For example, software modules 134 may include an ML application, an ANN application, a DNN application, a CNN application, an RNN application, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), DRAM, SRAM, ROM, flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for system 100. Software modules 134 provide various functionality, such as image classification using CNNs, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to system 100 and/or output from system 100. As discussed above, I/O devices 142 are operably connected to system 100 using a wired and/or wireless connection. I/O devices 142 may include a local processor coupled to a communication interface that is configured to communicate with system 100 using the wired and/or wireless connection. For example, I/O devices 142 may include a keyboard, mouse, touch pad, joystick, etc.

Display interface 150 is configured to transmit image data from system 100 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

HAs 170 are configured to execute ML models, such as, for example, ANNs, CNNs, RNNs, etc., in support of various applications embodied by software modules 134. Generally, HAs 170 include one or more processors, coprocessors, processing engines (PEs), compute engines (CEs), etc., such as, for example, CPUs, GPUs, NPUs (e.g., the ARM ML Processor), DSPs, field programmable gate arrays (FPGAs), application specific integrated circuits (ASICs), controllers, microcontrollers, matrix multiplier circuits, MAC arrays, etc. HAs 170 also include a communications bus interface as well as non-volatile and/or volatile memories, such as, for example, ROM, flash memory, SRAM, DRAM, etc.

In many embodiments, HA 170 receives the ANN model and weights from memory 130 over communication bus 110 for storage in local volatile memory (e.g., SRAM, DRAM, etc.). In other embodiments, HA 170 receives a portion of the ANN model and weights from memory 130 over communication bus 110. In these embodiments, HA 170 determines the instructions needed to execute the ANN model or ANN model portion. In other embodiments, the ANN model (or ANN model portion) simply includes the instructions needed to execute the ANN model (or ANN model portion). In these embodiments, processor 120 determines the instructions needed to execute the ANN model, or, processor 120 divides the ANN model into ANN model portions, and then determines the instructions needed to execute each ANN model portion. The instructions are then provided to HA 170 as the ANN model or ANN model portion.

In further embodiments, HA 170 may store ANN models, instructions and weights in non-volatile memory. In certain embodiments, the ANN model may be directly implemented in hardware using PEs, CEs, matrix multiplier units, MAC arrays, etc. Generally, HA 170 receives input data from memory 130 over communication bus 110, and transmit output data to memory 130 over communication bus 110. In certain embodiments, the input data may be associated with a layer (or portion of a layer) of the ANN model, and the output data from that layer (or portion of that layer) may be transmitted to memory 130 over communication bus 110.

For example, the ARM ML Processor supports a variety of ANNs, including CNNs and RNNs, for classification, object detection, image enhancements, speech recognition and natural language understanding. The ARM ML Processor includes a control unit, a direct memory access (DMA) engine, local memory and 16 CEs. Each CE includes, inter alia, a MAC engine that performs convolution operations, a programmable layer engine (PLE), local SRAM, a weight decoder, a control unit, a direct memory access (DMA) engine, etc. Each MAC engine performs up to eight 16-wide dot products with accumulation. Generally, the PLE performs non-convolution operations, such as, for example, pooling operations, ReLU activations, etc. Each CE receives input feature maps (IFMs) and weights sets over the NoC and stores them in local SRAM. The MAC engine and PLE process the IFMs to generate the output feature maps (OFMs), which are also stored in local SRAM prior to transmission over the NoC.

Figure 4:
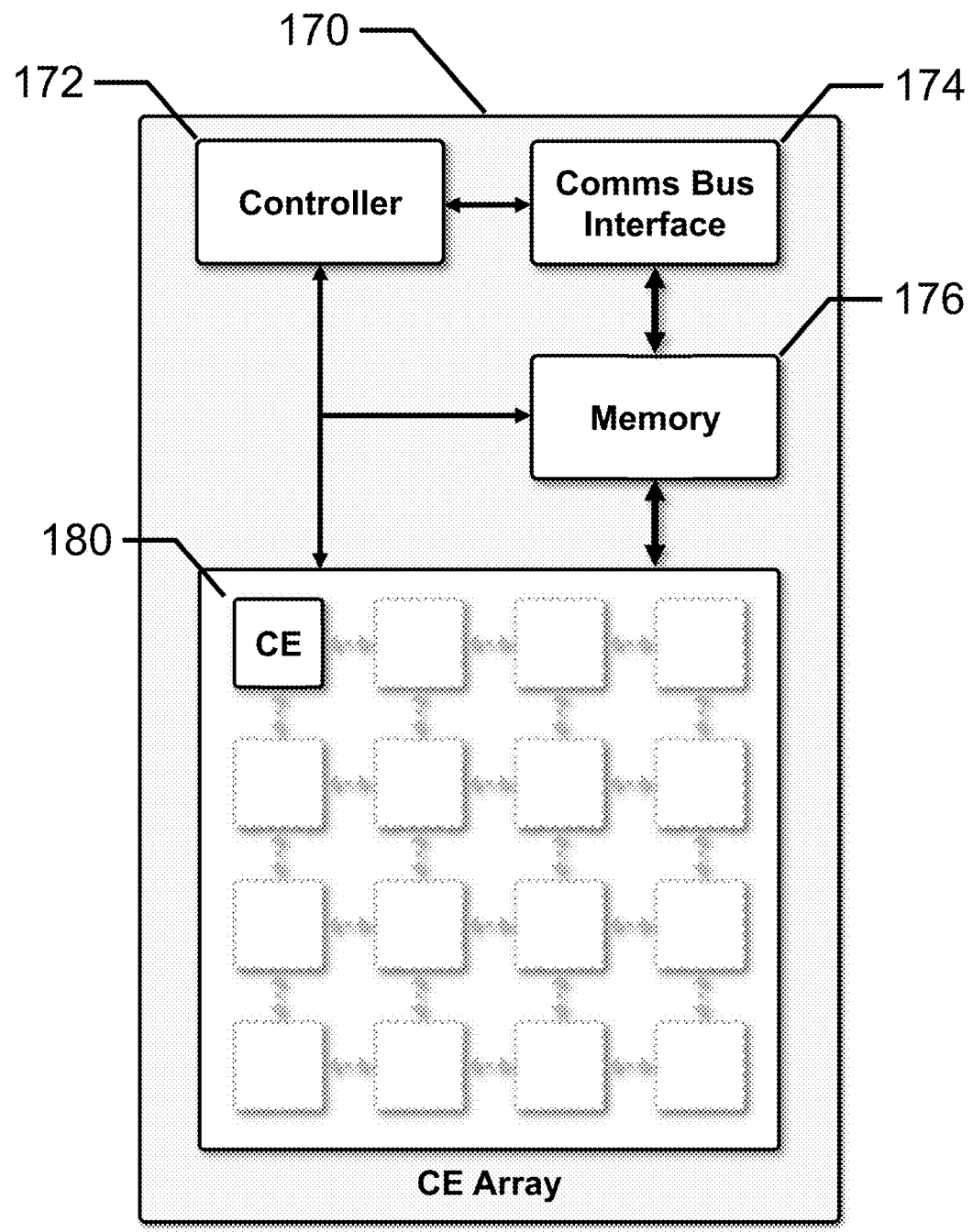
FIG. 4 depicts a hardware accelerator, in accordance with embodiments of the present disclosure.

FIG. 4 depicts a block diagram of hardware accelerator 170, in accordance with embodiments of the present disclosure.

HA 170 includes controller 172, communication bus interface 174, local memory 176 (e.g., SRAM, DRAM, etc.), and one or more CEs 180. Controller 172 generally controls the components, functions, data flow, etc. of HA 170. In other embodiments, a number of interconnected CEs 180 may be provided as array, such as, for example, 4 CEs, 8 CEs, 16 CEs (depicted in phantom in FIG. 4), 32 CEs, etc. Multiple CEs 180 may be interconnected by a NoC using a ring topology, a star topology, a mesh topology, etc. Alternatively, multiple CEs 180 may be interconnected using a cross-bar switch, direct connections, etc. Generally, each CE 180 may execute a portion of an ANN model using a portion of the ANN weights.

With respect to the accumulation calculations that are performed by processor 120 and HA 170, feedforward arithmetic operations may be pipelined in various ways, such as, for example, by using an N-stage floating-point arithmetic logic unit (ALU) with N>1. However, repeated back-to-back accumulation into the same processor register incurs an N-cycle stall or bubble because there is a dependency on the result of the previous operation. Table 1 presents an example of five, back-to-back accumulations that are performed into the same processor (accumulation) register R0. Processor registers R1 to R5 each contain a value to be accumulated.

TABLE 1

| Instruction | Description |
| --- | --- |
| MOV R0, #0 | Zero R0 |
| ADD R0, R0, R1 | Accumulate R1 into R0 (i.e., R0 = R0 + R1) |
| ADD R0, R0, R2 | Accumulate R2 into R0 (i.e., R0 = R0 + R2) |
| ADD R0, R0, R3 | Accumulate R3 into R0 (i.e., R0 = R0 + R3) |
| ADD R0, R0, R4 | Accumulate R4 into R0 (i.e., R0 = R0 + R4) |
| ADD R0, R0, R5 | Accumulate R5 into R0 (i.e., R0 = R0 + R5) |

After the first "MOV" instruction has been issued, all of the subsequent "ADD" instructions depend on the accumulation register R0. More particularly, each "ADD" operation reads the value stored in the accumulation register R0 as well as one of the other registers R1 to R5, adds these values together, and then stores the sum back into the accumulation register R0 by overwriting the previously-stored value. If the datapath is pipelined with N cycles, the next instruction must wait about N cycles before beginning, which reduces throughput. For N>1, this issue represents the N-cycle latency on the sum stored in the accumulation register R0.

In one embodiment of the present disclosure, two accumulation registers may be used. In this embodiment, accumulation registers R0 and R1 are used alternatively to store a portion of the partial sum of the accumulation calculation, and their respective contents are summed by the final instruction to produce the final sum. For processor 120, such as, for example, a general purpose CPU, the number of additional accumulation or result registers that are required is generally based on the N-cycle latency in the datapath. Table 2 presents an example of five, back-to-back accumulations that are performed using the processor (accumulation) registers R0 and R1. Processor registers R2 to R6 each contain a value to be accumulated.

TABLE 2

| Instruction | Description |
| --- | --- |
| MOV R0, #0 | Zero R0 |
| MOV R1, #0 | Zero R1 |
| ADD R0, R0, R2 | Accumulate R2 into R0 (i.e., R0 = R0 + R2) |
| ADD R1, R1, R3 | Accumulate R3 into R1 (i.e., R0 = R1 + R3) |
| ADD R0, R0, R4 | Accumulate R4 into R0 (i.e., R0 = R0 + R4) |
| ADD R1, R1, R5 | Accumulate R5 into R1 (i.e., R0 = R1 + R5) |
| ADD R0, R0, R6 | Accumulate R6 into R0 (i.e., R0 = R0 + R6) |
| ADD R0, R0, R1 | Accumulate R1 into R0 (i.e., R0 = R0 + R1) |

After the first and second "MOV" instructions have been issued, the subsequent "ADD" instructions alternate storing the partial sums between accumulation registers R0 and R1. More particularly, each R0-based "ADD" operation reads the values stored in the accumulation register R0 and one of the other processor registers R2, R4, R6, etc., adds these values together, and then stores the sum back into the accumulation register R0 by overwriting the previously-stored value. Similarly, each R1-based "ADD" operation reads the values stored in the accumulation register R1 and one of the other processor registers R3, R5, etc., adds these values together, and then stores the sum back into the accumulation register R1 by overwriting the previously-stored value. The final R0-based "ADD" operation combines the values stored in accumulation registers R0 and R1 to produce the final sum, and stores the final sum in accumulation register R0 by overwriting the previously-stored value.

Many embodiments of the present disclosure advantageously avoid increasing the number of processor registers while executing back-to-back accumulation operations.

Figure 5:
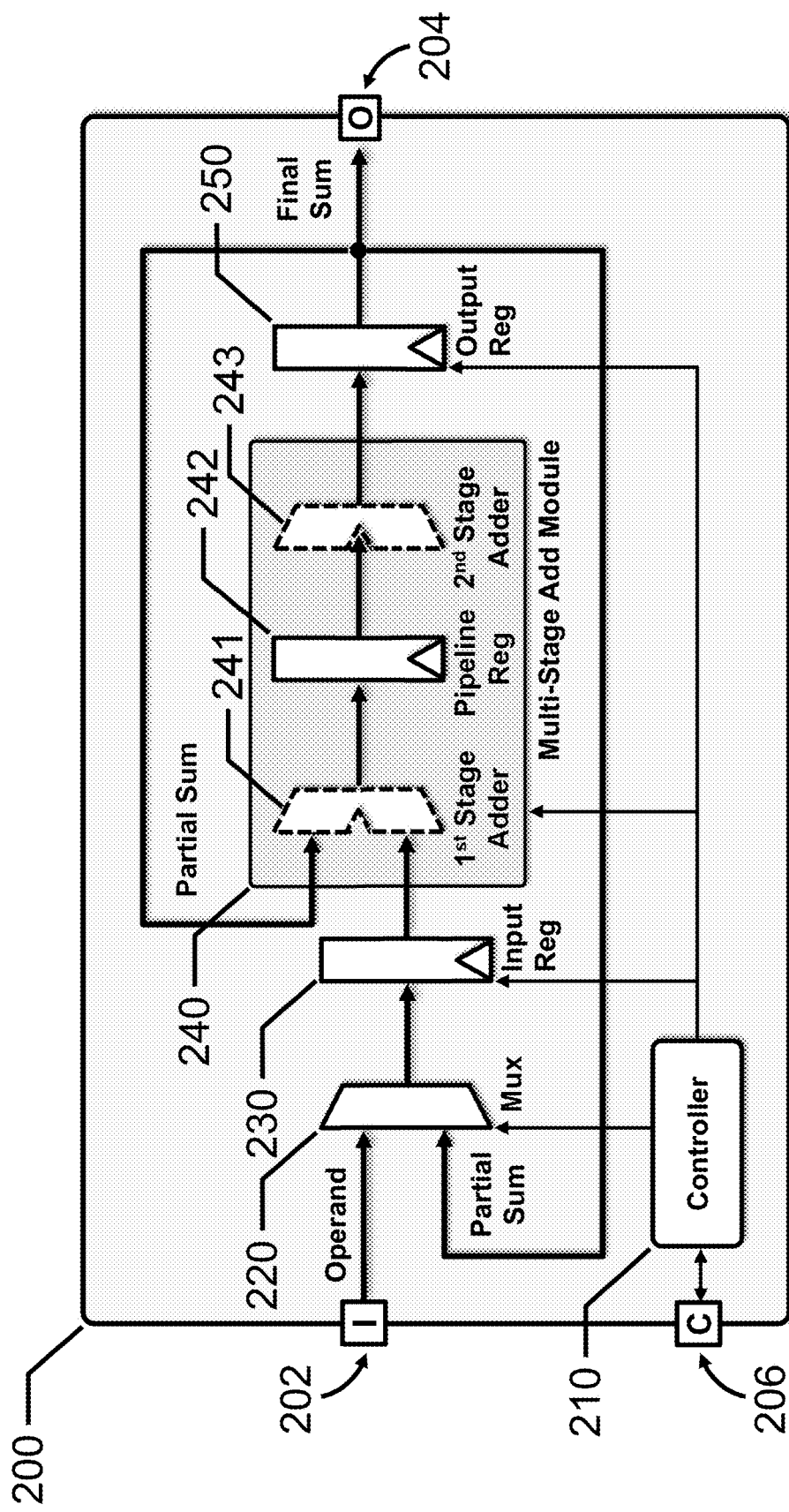
FIG. 5 depicts a pipelined accumulator, in accordance with embodiments of the present disclosure.
Figure 6A:
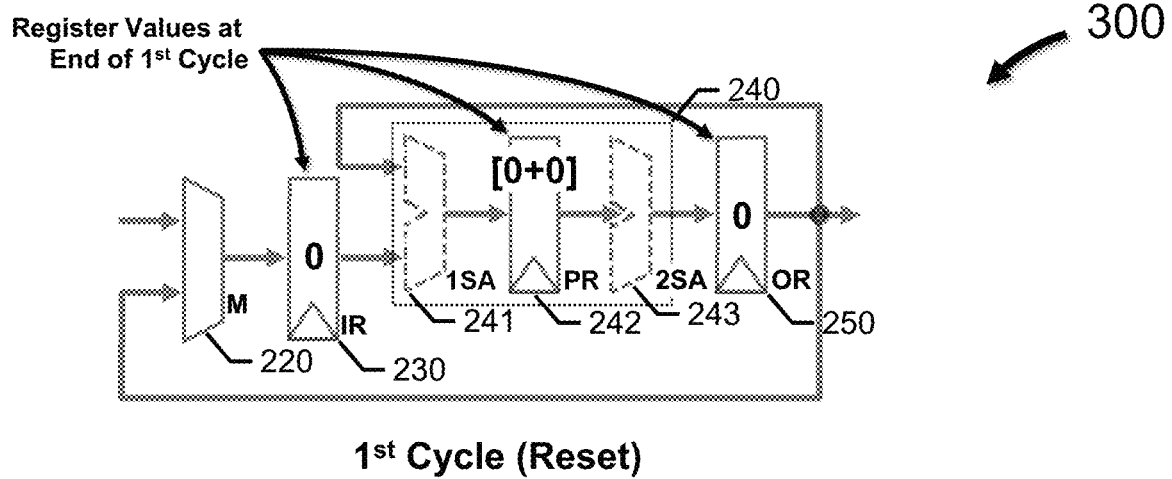
FIGS. 6A, 6B, 6C and 6D depict a processing cycle flow diagram for a pipelined accumulator, in accordance with embodiments of the present disclosure.
Figure 6A:
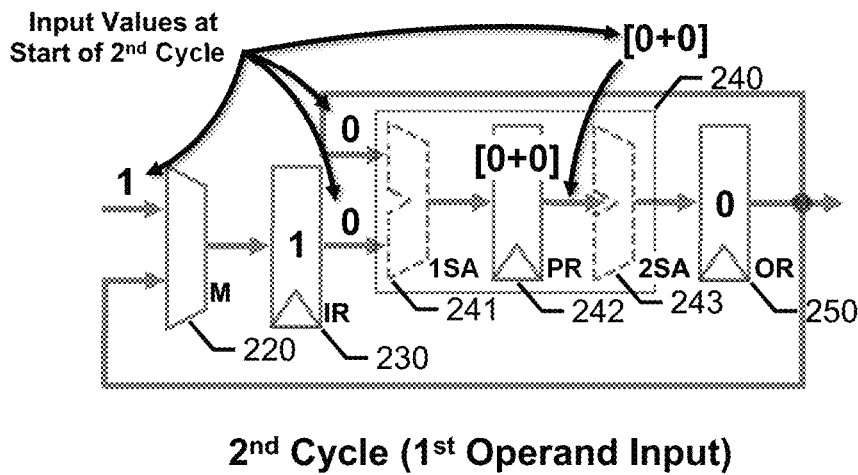
Figure 6A:
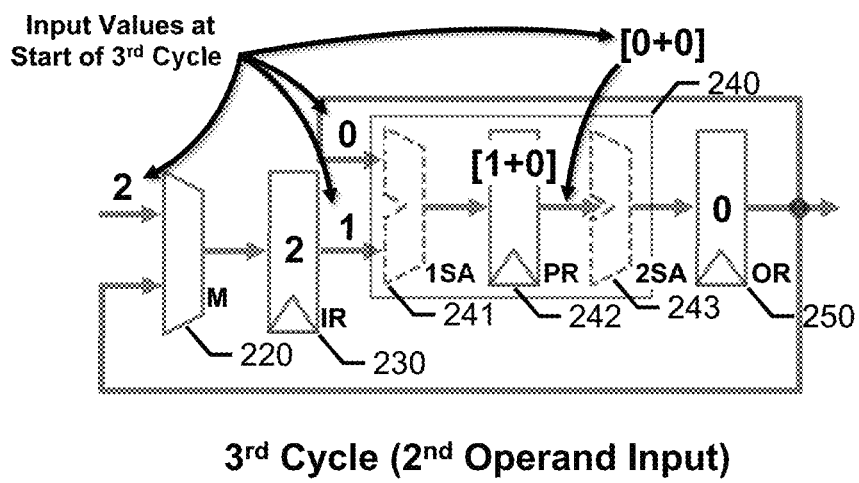
Figure 6B:
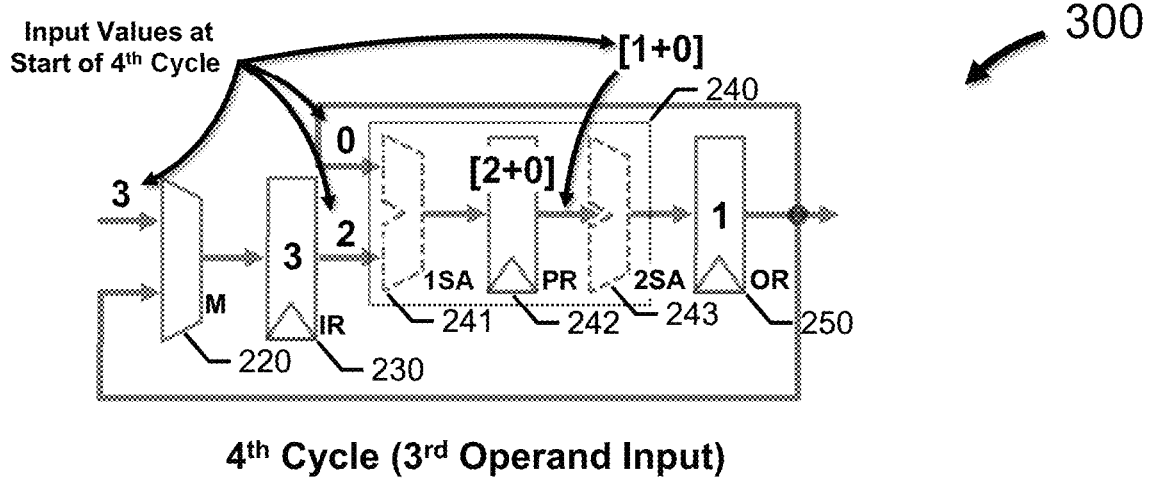
Figure 6B:
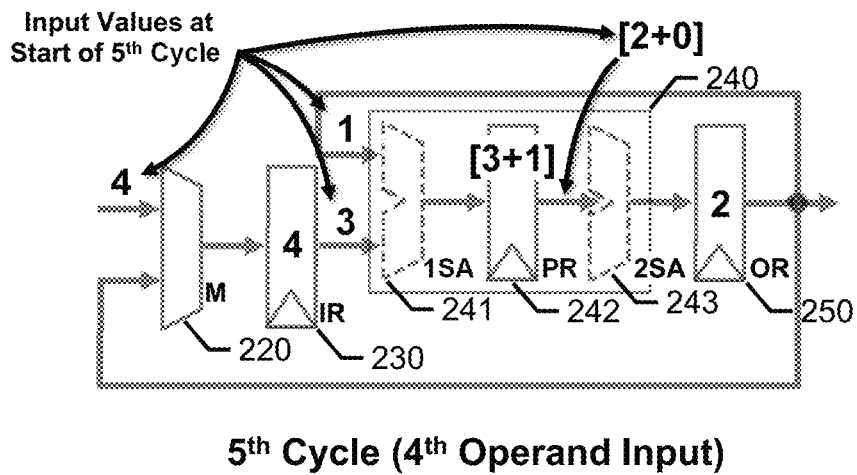
Figure 6B:
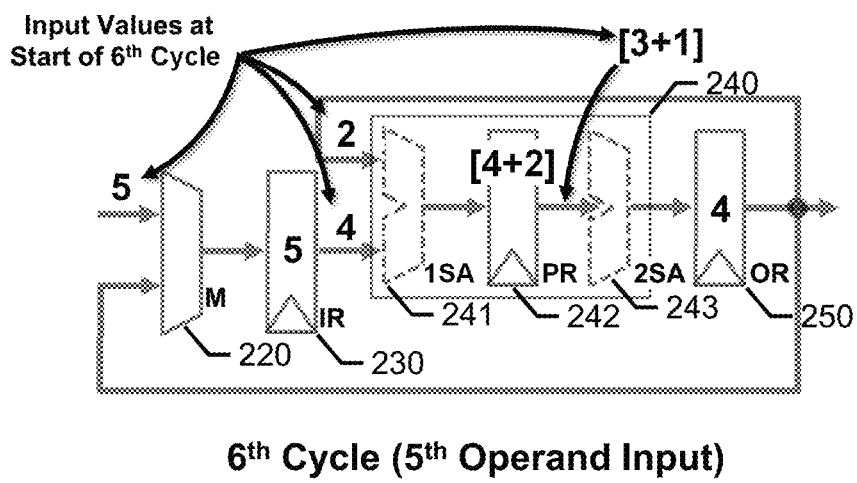
Figure 6C:
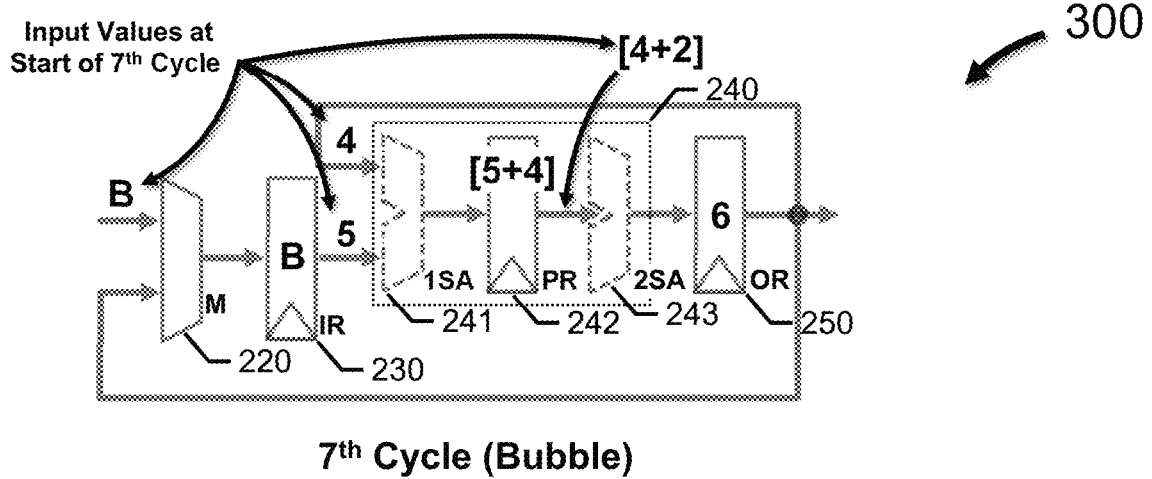
Figure 6C:
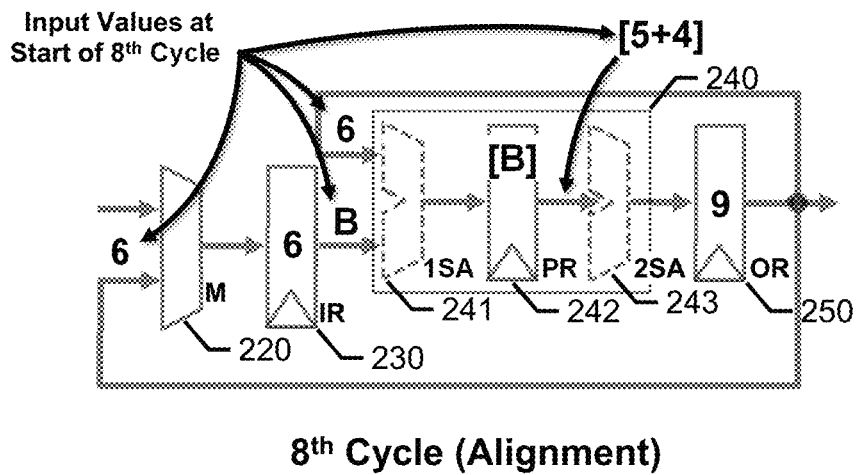
Figure 6C:
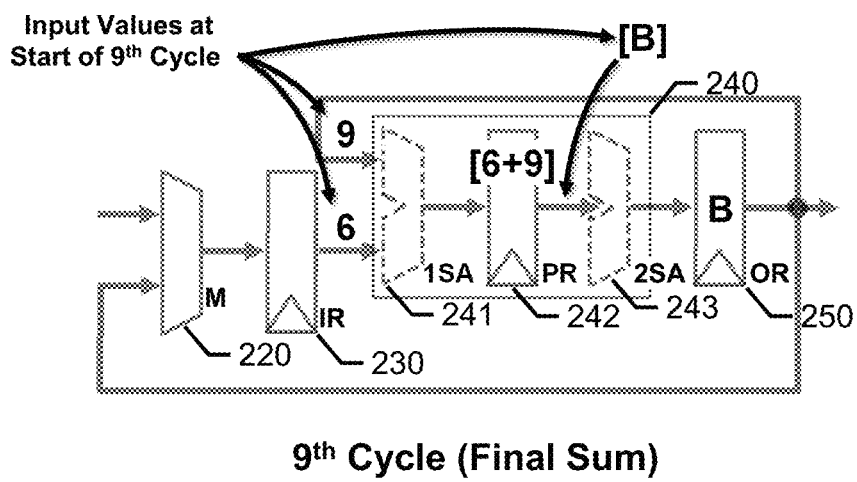
Figure 6D:
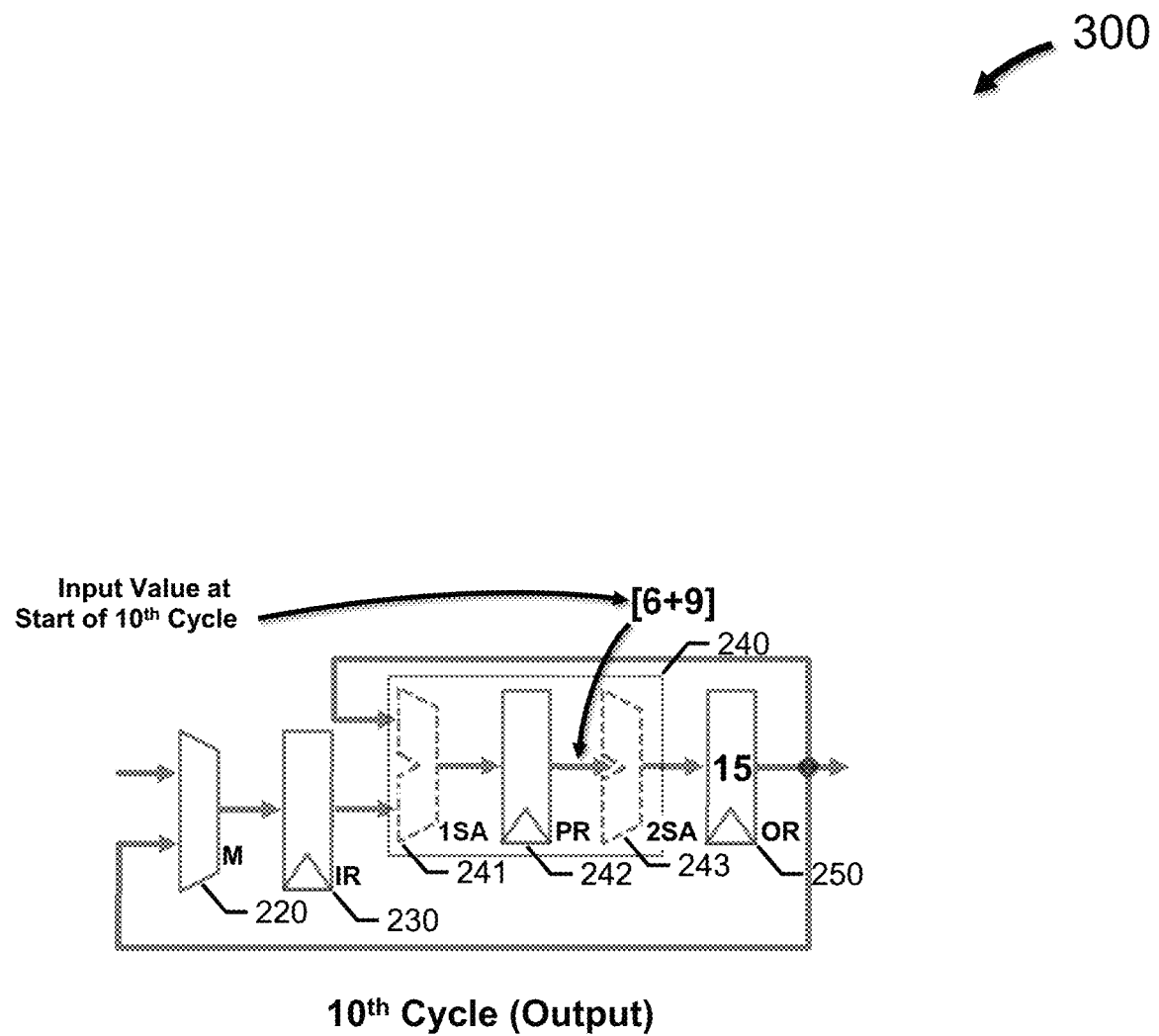

FIG. 5 depicts pipelined accumulator 200, in accordance with embodiments of the present disclosure.

Pipelined accumulators may be advantageously implemented within any processing device, processor, circuit, etc. that performs accumulation calculations, such as, for example. an ALU, a CPU, a hardware accelerator with one or more PEs or CEs, such as, for example, a GPU, an NPU, etc., a DSP, an FPGA, an ASIC, etc. Generally, pipelined accumulator processes sequences of digital data, such as, for example, 8-bit integers, 16-bit integers, 32-bit integers, 16-bit floating point numbers, 32-bit floating point numbers, etc.

In many embodiments, pipelined accumulator 200 includes input port 202, output port 204, control port 206, controller 210, multiplexor 220 ("Mux"), input register 230, multi-stage add module 240, and output register 250. Multi-stage add module includes $1^{st}$ stage adder 241, pipeline register 242 and $2^{nd}$ stage adder 243. Multi-stage add module 240 advantageously provides back-to-back accumulation into output register 250.

In many embodiments, multi-stage add module 240 provides a two cycle add operation, e.g., C=A+B, in which the functionality provided by a typical adder is divided between two adder stages and a register. During the first cycle, the $1^{st}$ stage adder 241 receives two input numbers, e.g., A and B, performs a "partial" addition and outputs a partial result that is stored in pipeline register 242. During the second cycle, the $2^{nd}$ stage adder 243 converts the partial result stored in pipeline register 242 into a complete result, e.g., C, which is stored in output register 250. The partial result is stored in a redundant format, such as, for example, carry-save format, while the complete result is stored in a non-redundant format. Generally, a non-redundant format represents a number in a unique way, while a redundant format represents a number in multiple, i.e., redundant, ways. In this context, the redundant format represents digital data using more bits than is needed to represent a single binary digit, while the non-redundant format does not.

Because some of the functionality of a typical adder is implemented by $1^{st}$ stage adder 241, and some of the functionality is implemented by $2^{nd}$ stage adder 243, the result, C, of the addition of two numbers, A+B, is not completed until the $2^{nd}$ stage adder 243 converts the partial result stored in pipeline register 242 into the complete result. In certain embodiments, the partial result may be stored in carry-save format as two digital numbers representing the sum bits and the carry bits of the result, C. In these embodiments, $2^{nd}$ stage adder 243 simply adds the two digital numbers together to produce the result, C, in non-redundant or standard format, which is stored in output register 250.

Controller 210 is coupled to control port 206, multiplexor 220, input register 230, multi-stage add module 240 and output register 250. Generally, controller 210 manages the operation of pipelined accumulator 200, including, for example, reset, input selection for multiplexor 220, etc. Controller 210 may be a simple microcontroller, a programmable circuit, etc.

Input port 202 receives a sequence of operands to be accumulated, and output port 204 outputs the final sum of the accumulation calculation.

Control port 206 receives and transmits various control signals for controller 210, such as, for example, a reset command signal, an end-of-sequence command signal, an accumulation complete signal, etc.

In one embodiment, in response to receiving a reset command signal, controller 210 executes a reset processing cycle by issuing a reset signal to multiplexor 220, input register 230, multi-stage add module 240, and output register 250. Controller 210 then executes an operand input processing cycle for each operand in the sequence of operands to be accumulated. In response to receiving an end-of-sequence command signal, controller 210 executes a sequence of processing cycles to complete the accumulation calculation. This sequence of processing cycles includes a bubble processing cycle, an alignment processing cycle, a final sum processing cycle, and an output processing cycle. During the output processing cycle, controller 210 transmits an accumulation complete signal to indicate that the final sum is available on output port 204. Other command and response signals are also contemplated. The various processing cycles are described in more detail below.

Multiplexor 220 has a first input, a second input and an output. Multiplexor 220 outputs the digital data provided at either the first input or the second input based on an input selection signal from controller 210. The first input is coupled to input port 202, and is configured to receive the sequence of operands to be accumulated from input port 202. The second input is coupled to output register 250. In response to a reset signal from controller 210, multiplexor 220 selects the first input.

Input register 230 is coupled to the output of multiplexor 220 and to multi-stage add module 240. Input register 230 stores the data received from multiplexor 220, and provide the stored data to multi-stage add module 240. In response to a reset signal from controller 210, input register 230 sets the stored data value to zero.

As described above, multi-stage add module includes $1^{st}$ stage adder 241, pipeline register 242 and $2^{nd}$ stage adder 243. The $1^{st}$ stage adder 241 has a first input, a second input and an output. The first input is coupled to input register 230, the second input is coupled to output register 250 and the output is coupled to pipeline register 242. The $1^{st}$ stage adder 241 adds the data values provided to the first and second inputs, and outputs a partial result to pipeline register 242, as discussed above. The $2^{nd}$ stage adder 243 has an input coupled to pipeline register 242, and an output coupled to output register 250. The $2^{nd}$ stage adder 243 converts the partial result stored in pipeline register 242 into a complete result. Multi-stage add module 240 may be configured to receive a reset signal from controller 210, and, in response, set the stored data values of pipeline register 242 to zero, and, optionally, reset $1^{st}$ stage adder 241 and $2^{nd}$ stage adder 243.

Output register 250 is coupled to the output of $2^{nd}$ stage adder 243, and to the second input of $1^{st}$ stage adder 241, the second input of multiplexor 220 and output port 204. In response to a reset signal from controller 210, output register 250 sets the stored data to zero.

Generally, pipelined accumulator 200 executes a number of processing cycles that depends upon the number of operands that are to be accumulated. As discussed above, these processing cycles may include, inter alia, a reset processing cycle, an operand input processing cycle for each operand in the sequence of operands to be accumulated, a bubble processing cycle, an alignment processing cycle, a final sum processing cycle, and an output processing cycle. In this embodiment, ten (10) processing cycles may be needed to accumulate a sequence of five (5) operands. In many embodiments, pipelined accumulator 200 is located within the same clock domain as the source of the operand data. In other embodiments, pipelined accumulator 200 may be located within a different clock domain, which may require the operand data to be externally buffered.

FIGS. 6A, 6B, 6C and 6D depict processing cycle diagram 300 for pipelined accumulator 200, in accordance with embodiments of the present disclosure.

In the example depicted, the first five integers, i.e., 1, 2, 3, 4 and 5, are accumulated over 10 processing cycles including a $1^{st}$ cycle (reset), a $2^{nd}$ cycle ($1^{st}$ operand input), a $3^{rd}$ cycle ($2^{nd}$ operand input), a $4^{th}$ cycle ($3^{rd}$ operand input), a $5^{th}$ cycle ($4^{th}$ operand input), a $6^{th}$ cycle ($5^{th}$ operand input), a $7^{th}$ cycle (bubble), an $8^{th}$ cycle (alignment), a $9^{th}$ cycle (final sum) and a $10^{th}$ cycle (output). The values presented to the selected input of multiplexor 220 and both of the inputs of $1^{st}$ stage adder 241 at the start of each cycle are depicted, and the values stored in input register 230 and output register 250 at the end of each processing cycle are depicted. Additionally, the two numbers that have been partially added by $1^{st}$ stage adder 241 and stored in pipeline register 242 as a partial result are shown in brackets (i.e., "[0+0]"); the actual value of the partial result is not shown for clarity.

In this embodiment, the total number of processing cycles to accumulate N operands using pipelined accumulator 200 is N+5. For example, the total number of processing cycles to accumulate 10 operands using pipelined accumulator 200 is 15. In other embodiments, one or more additional pipeline stages may be added to multi-stage add module 240. Each additional pipeline stage adds an adder stage and a pipeline register, as well as an additional processing cycle to read out the final sum. Advantageously, multi-stage add module 240 may be arbitrarily pipelined as needed to meet cycle time. While additional processing cycles are needed to read out the final sum after the last operand has been processed (when compared to a traditional accumulator), the overhead is typically negligible for workloads that perform extensive accumulation into the same register.

In response to receiving a reset command signal, controller 210 executes a reset processing cycle.

The $1^{st}$ cycle (reset) is initiated by controller 210 when a reset command signal is received via control port 206. Controller 210 issues a reset signal to multiplexor 220, input register 230, multi-stage add module 240 and output register 250, and, in response, multiplexor 220 selects the first input, and input register 230, pipeline register 242 and output register 250 reset their respective stored values to zero. The $1^{st}$ stage adder 241 and the $2^{nd}$ stage adder 243 may be initialized, as needed.

Controller 210 then executes an operand input processing cycle for each operand in the sequence of operands to be accumulated.

At the start of the $2^{nd}$ cycle ($1^{st}$ operand input), the first operand (i.e., 1) is presented to the first input of multiplexor 220, the value stored in input register 230 (i.e., 0) is presented to the first input of $1^{st}$ stage adder 241, and the value stored in output register 250 (i.e., 0) is presented to the second input of $1^{st}$ stage adder 241. Additionally, the partial result stored in pipeline register 242 (i.e., [0+0]) is presented to the input of $2^{nd}$ stage adder 243. The $1^{st}$ stage adder 241 latches the input data, adds the two values to generate a partial result, and outputs the partial result (i.e., [0+0]) to pipeline register 242 for storage. Similarly, the $2^{nd}$ stage adder 243 latches the input data, converts the partial result into a complete result, and outputs the complete result (i.e., 0) to output register 250 for storage.

At the start of the $3^{rd}$ cycle ($2^{nd}$ operand input), the second operand (i.e., 2) is presented to the first input of multiplexor 220, the value stored in input register 230 (i.e., 1) is presented to the first input of $1^{st}$ stage adder 241, and the value stored in output register 250 (i.e., 0) is presented to the second input of $1^{st}$ stage adder 241. Additionally, the partial result stored in pipeline register 242 (i.e., [0+0]) is presented to the input of $2^{nd}$ stage adder 243. The $1^{st}$ stage adder 241 latches the input data, adds the two values to generate a partial result, and outputs the partial result (i.e., [1+0]) to pipeline register 242 for storage. Similarly, the $2^{nd}$ stage adder 243 latches the input data, converts the partial result into a complete result, and outputs the complete result (i.e., 0) to output register 250 for storage.

At the start of the $4^{th}$ cycle ($3^{rd}$ operand input), the third operand (i.e., 3) is presented to the first input of multiplexor 220, the value stored in input register 230 (i.e., 2) is presented to the first input of $1^{st}$ stage adder 241, and the value stored in output register 250 (i.e., 0) is presented to the second input of $1^{st}$ stage adder 241. Additionally, the partial result stored in pipeline register 242 (i.e., [1+0]) is presented to the input of $2^{nd}$ stage adder 243. The $1^{st}$ stage adder 241 latches the input data, adds the two values to generate a partial result, and outputs the partial result (i.e., [2+0]) to pipeline register 242 for storage. Similarly, the $2^{nd}$ stage adder 243 latches the input data, converts the partial result into a complete result, and outputs the complete result (i.e., 1) to output register 250 for storage.

At the start of the $5^{th}$ cycle ($4^{th}$ operand input), the fourth operand (i.e., 4) is presented to the first input of multiplexor 220, the value stored in input register 230 (i.e., 3) is presented to the first input of $1^{st}$ stage adder 241, and the value stored in output register 250 (i.e., 1) is presented to the second input of $1^{st}$ stage adder 241. Additionally, the partial result stored in pipeline register 242 (i.e., [2+0]) is presented to the input of $2^{nd}$ stage adder 243. The $1^{st}$ stage adder 241 latches the input data, adds the two values to generate a partial result, and outputs the partial result (i.e., [3+1]) to pipeline register 242 for storage. Similarly, the $2^{nd}$ stage adder 243 latches the input data, converts the partial result into a complete result, and outputs the complete result (i.e., 2) to output register 250 for storage.

At the start of the $6^{th}$ cycle ($5^{th}$ operand input), the fifth operand (i.e., 5) is presented to the first input of multiplexor 220, the value stored in input register 230 (i.e., 4) is presented to the first input of $1^{st}$ stage adder 241, and the value stored in output register 250 (i.e., 2) is presented to the second input of $1^{st}$ stage adder 241. Additionally, the partial result stored in pipeline register 242 (i.e., [3+1]) is presented to the input of $2^{nd}$ stage adder 243. The $1^{st}$ stage adder 241 latches the input data, adds the two values to generate a partial result, and outputs the partial result (i.e., [4+2]) to pipeline register 242 for storage. Similarly, the $2^{nd}$ stage adder 243 latches the input data, converts the partial result into a complete result, and outputs the complete result (i.e., 4) to output register 250 for storage.

In response to receiving an end-of-sequence command signal, controller 210 then executes a sequence of processing cycles to complete the accumulation calculation.

At the start of the 7$^{th}$ cycle (bubble), a bubble is presented to the first input of multiplexor 220, the value stored in input register 230 (i.e., 5) is presented to the first input of 1$^{st}$ stage adder 241, and the value stored in output register 250 (i.e., 4) is presented to the second input of 1$^{st}$ stage adder 241. Additionally, the partial result stored in pipeline register 242 (i.e., [4+2]) is presented to the input of 2$^{nd}$ stage adder 243. The 1$^{st}$ stage adder 241 latches the input data, adds the two values to generate a partial result, and outputs the partial result (i.e., [5+4]) to pipeline register 242 for storage. Similarly, the 2$^{nd}$ stage adder 243 latches the input data, converts the partial result into a complete result, and outputs the complete result (i.e., 6) to output register 250 for storage. The bubble presented to the first input of multiplexor 220 and stored in input register 230 can be any number, since this value will not be used in any subsequent calculation. In one embodiment, the bubble is zero; other values are also contemplated.

Controller 210 then sends an input selection signal to multiplexor 220 to select the second input. In other embodiments, the second input of multiplexor 220 may be selected at the start of, or during, the 7$^{th}$ cycle (bubble).

At the start of the 8$^{th}$ cycle (alignment), the value stored in output register 250 (i.e., 6) is presented to the second input of multiplexor 220, the bubble stored in input register 230 is presented to the first input of 1$^{st}$ stage adder 241, and the value stored in output register 250 (i.e., 6) is presented to the second input of 1$^{st}$ stage adder 241. Additionally, the partial result stored in pipeline register 242 (i.e., [5+4]) is presented to the input of 2$^{nd}$ stage adder 243. The 1$^{st}$ stage adder 241 latches the input data, adds the two values to generate a partial result, and outputs the partial result (i.e., [B]) to pipeline register 242 for storage. As noted above, this partial result is not used in any subsequent calculation. Similarly, the 2$^{nd}$ stage adder 243 latches the input data, converts the partial result into a complete result, and outputs the complete result (i.e., 9) to output register 250 for storage.

At the start of the 9$^{th}$ cycle (final sum), the value stored in input register 230 (i.e., 6) is presented to the first input of 1$^{st}$ stage adder 241, and the value stored in output register 250 (i.e., 9) is presented to the second input of 1$^{st}$ stage adder 241. Additionally, the partial result stored in pipeline register 242 (i.e., [B]) is presented to the input of 2$^{nd}$ stage adder 243. The 1$^{st}$ stage adder 241 latches the input data, adds the two values to generate a partial result, and outputs the partial result (i.e., [6+9]) to pipeline register 242 for storage. Similarly, the 2$^{nd}$ stage adder 243 latches the input data, converts the partial result into a complete result, and outputs the complete result (i.e., B) to output register 250 for storage. As noted above, this complete result is not used in any subsequent calculation.

During the 10$^{th}$ cycle (output), the partial result stored in pipeline register 242 (i.e., [6+9]) is presented to the input of 2$^{nd}$ stage adder 243, which latches the input data, converts the partial result into a complete result, and outputs the complete result (i.e., 15) to output register 250 for storage. Output register 250 then outputs this value to output port 204.

Controller 210 then transmits an accumulation complete signal to indicate that the final sum is available on output port 204.

Pipelined accumulator 200 may be advantageously combined with one or more multipliers to form a pipelined multiply-and-accumulate (MAC) unit, which is broadly applicable to CPUs, GPUs, NPUs, etc. As discussed above, pipelined accumulators and pipelined MAC units are especially relevant for computing large matrix multiply kernels, which are currently receiving more attention than ever due to the emphasis on neural networks.

Figure 7:
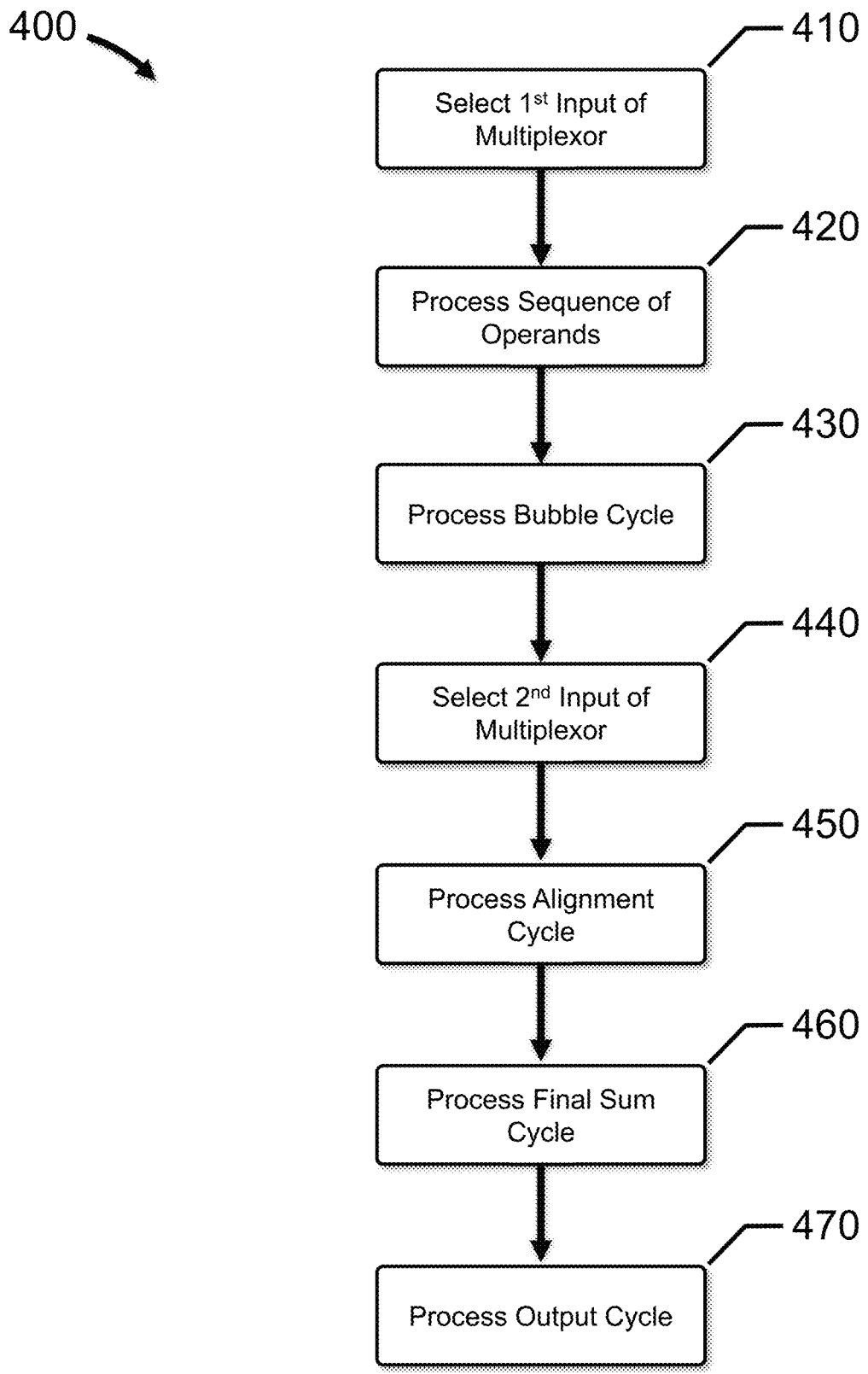
FIG. 7 depicts a flow diagram presenting functionality for performing pipelined accumulations, in accordance with embodiments of the present disclosure.

FIG. 7 depict a flow diagram 400 presenting functionality for performing pipelined accumulations, in accordance with embodiments of the present disclosure. For clarity, the elements of pipelined accumulator 200 are referenced.

At 410, a first input of multiplexor 220 is selected.

At 420, a sequence of operands is processed. For each operand, the operand is received at a first input of multiplexor 220. A value stored in input register 230 and a value stored in output register 250 are added, by 1$^{st}$ stage adder 241, to generate a partial result. The partial result stored in pipeline register 242 is converted, by 2$^{nd}$ stage adder 243, to a complete result. The operand is stored in input register 230, the partial result is stored in pipeline register 242, and the complete result is stored in output register 250 as a partial sum.

At 430, a bubble cycle is processed. The value stored in input register 230 and the value stored in output register 250 are added, by 1$^{st}$ stage adder 241, to generate a partial result. The partial result stored in pipeline register 242 is converted, by 2$^{nd}$ stage adder 243, to a complete result. The partial result is stored in pipeline register 242, and the complete result is stored in output register 250 as the partial sum.

At 440, a second input of multiplexor 220 is selected. In other embodiments, the second input of multiplexor 220 may be selected at the start of, or during, the bubble cycle.

At 450, an alignment cycle is processed. The value stored in output register 250 is received at the second input of multiplexor 220. The partial result stored in pipeline register 242 is converted, by 2$^{nd}$ stage adder 243, to a complete result. The value received at the second input of multiplexor 220 is stored in input register 230, and the complete result is stored in output register 250 as the partial sum.

At 460, a final sum cycle is processed. The value stored in input register 230 and the value stored in output register 250 are added, by 1$^{st}$ stage adder 241, to generate a partial result, which is then stored in pipeline register 242.

At 470, an output cycle is processed. The partial result stored in pipeline register 242 is converted, by 2$^{nd}$ stage adder 243, to a complete result. The complete result is then stored in output register 250 as a final sum, and the final sum is output.

Certain embodiments of the present disclosure include floating-point accumulations for CPU implementations. Because floating-point operations are generally not associative, the accumulation may need to be re-ordered to produce a correct result. In one embodiment, a "non-associative" floating-point MAC instruction may be added to the CPU's instruction set, e.g., FPMAC_NA (non-associative), and CPU interrupts may be disabled or masked during the execution of this instruction. For situations in which A+B versus B+A is not important, the application calls the FPMAC_NA instruction which yields a throughput of one operation per cycle. For situations in which A+B versus B+A is important, the application calls an FPMAC instruction which yields a throughput of one operation for every two cycles in return for determinism. The FPMAC instruction calls a standard FPMAC unit, while the FPMAC_NA instruction calls a non-associative FPMAC unit that includes the multiplexor, adder, first register, second register and third register.

As noted above, embodiments of the present disclosure advantageously provide a pipelined accumulator without stalls for register dependency. When accumulating a large number of operands, which is common for large dot-products, the instantaneous value of the accumulator is only required at the end of the final dot product calculation. In other words, the true correct value is only required at the end of the sequence when the accumulator register is read out. Accordingly, embodiments of the present disclosure advantageously relax the register dependency and allow back-to-back accumulation into the same register.

The embodiments described herein are combinable.

In one embodiment, a hardware accelerator includes a computing engine (CE) that has a plurality of pipelined accumulators. Each pipelined accumulator includes a multiplexor having a first input, a second input and an output, the first input configured to receive a sequence of operands to be summed; an input register coupled to the output of the multiplexor; a multi-stage add module that includes a first stage adder, having a first input coupled to the input register, a second input, and an output, configured to add two numbers and output a partial result, a pipeline register, coupled to the output of the first stage adder, configured to store the partial result, and a second stage adder, having an output and an input coupled to the pipeline register, configured to convert the partial result into a complete result and output the complete result; and an output register, coupled to the output of the second stage adder, the second input of the multiplexor and the second input of the first stage adder, configured to store a sequence of partial sums and output a final sum.

In another embodiment of the hardware accelerator, the hardware accelerator further includes a communication bus interface configured to receive at least a portion of an artificial neural network (ANN) model with ANN weights, and input data, and transmit output data; a memory, coupled to the communication bus interface, configured to store the portion of the ANN model, the ANN weights, the input data and the output data; and a controller coupled to the communication bus interface and the memory, where the CE includes a multiplier coupled to each pipelined accumulator to form a plurality of pipelined multiply-and-accumulate (MAC) units.

In another embodiment of the hardware accelerator, the ANN model is a convolutional neural network (CNN) model that includes an input layer, at least one convolutional layer, a fully connected layer and an output layer.

In another embodiment of the hardware accelerator, the partial result has a redundant format and the complete result has a non-redundant format.

In another embodiment of the hardware accelerator, the redundant format is a carry save format.

In another embodiment of the hardware accelerator, each pipelined accumulator executes a number of processing cycles including a reset cycle, an operand input processing cycle for each operand, a bubble processing cycle, an alignment processing cycle, a final sum processing cycle, and an output processing cycle.

In another embodiment of the hardware accelerator, the pipeline register stores a portion of a partial sum of the operands and the output register stores a remaining portion of the partial sum of the operands during the operand input processing cycles and the bubble processing cycle.

In another embodiment of the hardware accelerator, the multi-stage add module further includes one or more additional pipeline stages.

In one embodiment, a pipelined accumulator includes a multiplexor having a first input, a second input and an output, the first input configured to receive a sequence of operands to be summed; an input register coupled to the output of the multiplexor; a multi-stage add module, including a first stage adder, having a first input coupled to the input register, a second input, and an output, configured to add two numbers and output a partial result, an pipeline register, coupled to the output of the first stage adder, configured to store the partial result, and a second stage adder, having an output and an input coupled to the pipeline register, configured to convert the partial result into a complete result and output the complete result; and an output register, coupled to the output of the second stage adder, the second input of the multiplexor and the second input of the first stage adder, configured to store a sequence of partial sums and output a final sum.

In another embodiment of the pipelined accumulator, the partial result has a redundant format and the complete result has a non-redundant format.

In another embodiment of the pipelined accumulator, the redundant format is a carry save format.

In another embodiment of the pipelined accumulator, the pipelined accumulator executes a number of processing cycles including a reset cycle, an operand input processing cycle for each operand, a bubble processing cycle, an alignment processing cycle, a final sum processing cycle, and an output processing cycle.

In another embodiment of the pipelined accumulator, the pipeline register stores a portion of a partial sum of the operands and the output register stores a remaining portion of the partial sum of the operands during the operand input processing cycles and the bubble processing cycle.

In another embodiment of the pipelined accumulator, the multi-stage add module further includes one or more additional pipeline stages.

In a further embodiment, an arithmetic logic unit includes the pipelined accumulator.

In a further embodiment, a central processing unit includes the pipelined accumulator.

In a further embodiment, a hardware accelerator includes the pipelined accumulator, and, in another embodiment, the hardware accelerator is a graphics processing unit or a neural processing unit.

In one embodiment, a pipelined accumulator includes a data selector configured to receive a sequence of operands to be summed; an input register coupled to the data selector; an output register, coupled to the data selector, configured to store a sequence of partial sums and output a final sum; and a multi-stage add module, coupled to the input register and the output register, configured to store a sequence of partial sums and a final sum in a redundant format, and perform back-to-back accumulation into the output register.

In another embodiment of the pipelined accumulator, the redundant format is a carry save format.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A hardware accelerator, comprising:
    a computing engine (CE) including a plurality of pipelined accumulators, each pipelined accumulator including:
        a multiplexor having a first input, a second input and an output, the first input configured to receive a sequence of operands to be summed;
        an input register coupled to the output of the multiplexor;
        a multi-stage add module, including:
            a first stage adder, having a first input coupled to the input register, a second input, and an output, configured to add two numbers and output a partial result,
            a pipeline register, coupled to the output of the first stage adder, configured to store the partial result, and
            a second stage adder, having an output and an input coupled to the pipeline register, configured to convert the partial result into a complete result and output the complete result; and
        an output register, coupled to the output of the second stage adder, the second input of the multiplexor and the second input of the first stage adder, configured to store a sequence of partial sums and output a final sum.

2. The hardware accelerator of claim 1, further comprising:
    a communication bus interface configured to:
        receive at least a portion of an artificial neural network (ANN) model with ANN weights, and input data, and
        transmit output data;
    a memory, coupled to the communication bus interface, configured to store the portion of the ANN model, the ANN weights, the input data and the output data; and
    a controller coupled to the communication bus interface and the memory,
    where the CE includes a multiplier coupled to each pipelined accumulator to form a plurality of pipelined multiply-and-accumulate (MAC) units.

3. The hardware accelerator of claim 2, where the ANN model is a convolutional neural network (CNN) model that includes an input layer, at least one convolutional layer, a fully-connected layer and an output layer.

4. The hardware accelerator of claim 1, where the partial result has a redundant format and the complete result has a non-redundant format.

5. The hardware accelerator of claim 4, where the redundant format is a carry-save format.

6. The hardware accelerator of claim 1, where each pipelined accumulator executes a number of processing cycles including a reset cycle, an operand input processing cycle for each operand, a bubble processing cycle, an alignment processing cycle, a final sum processing cycle, and an output processing cycle.

7. The hardware accelerator of claim 6, where the pipeline register stores a portion of a partial sum of the operands and the output register stores a remaining portion of the partial sum of the operands during the operand input processing cycles and the bubble processing cycle.

8. The hardware accelerator of claim 1, where the multi-stage add module further includes one or more additional pipeline stages.

9. A pipelined accumulator, comprising:
a multiplexor having a first input, a second input and an output, the first input configured to receive a sequence of operands to be summed;
an input register coupled to the output of the multiplexor;
a multi-stage add module, including:
a first stage adder, having a first input coupled to the input register, a second input, and an output, configured to add two numbers and output a partial result,
an pipeline register, coupled to the output of the first stage adder, configured to store the partial result, and
a second stage adder, having an output and an input coupled to the pipeline register, configured to convert the partial result into a complete result and output the complete result; and
an output register, coupled to the output of the second stage adder, the second input of the multiplexor and the second input of the first stage adder, configured to store a sequence of partial sums and output a final sum.

10. The pipelined accumulator of claim 9, where the partial result has a redundant format and the complete result has a non-redundant format.

11. The pipelined accumulator of claim 10, where the redundant format is a carry-save format.

12. The pipelined accumulator of claim 9, where the pipelined accumulator executes a number of processing cycles including a reset cycle, an operand input processing cycle for each operand, a bubble processing cycle, an alignment processing cycle, a final sum processing cycle, and an output processing cycle.

13. The pipelined accumulator of claim 12, where the pipeline register stores a portion of a partial sum of the operands and the output register stores a remaining portion of the partial sum of the operands during the operand input processing cycles and the bubble processing cycle.

14. The pipelined accumulator of claim 9, where the multi-stage add module further includes one or more additional pipeline stages.

15. An arithmetic logic unit including the pipelined accumulator according to claim 9.

16. A central processing unit including the pipelined accumulator according to claim 9.

17. A hardware accelerator including the pipelined accumulator according to claim 9.

18. The hardware accelerator of claim 17, where the hardware accelerator is a graphics processing unit or a neural processing unit.

19. A pipelined accumulator, comprising:
a data selector configured to receive a sequence of operands to be summed;
an input register coupled to the data selector;
an output register, coupled to the data selector, configured to store a sequence of partial sums and output a final sum; and
a multi-stage add module, coupled to the input register and the output register, configured to store a sequence of partial sums and a final sum in a redundant format, and perform back-to-back accumulation into the output register.

20. The pipelined accumulator of claim 19, where the redundant format is a carry-save format.

* * * * *